(12) United States Patent
Sakanaka et al.

(10) Patent No.: US 7,346,282 B2
(45) Date of Patent: Mar. 18, 2008

(54) OPTICAL-TRANSMISSION-SPACE DETERMINING APPARATUS AND OPTICAL-SPACE TRANSMISSION APPARATUS

(75) Inventors: Tetsuo Sakanaka, Sagamihara (JP); Masatoshi Otsubo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 11/139,328

(22) Filed: May 27, 2005

(65) Prior Publication Data
US 2005/0265724 A1    Dec. 1, 2005

(30) Foreign Application Priority Data
May 31, 2004    (JP)    ............... 2004-161101

(51) Int. Cl.
*H04B 10/00*    (2006.01)
(52) U.S. Cl. ............... 398/130; 398/129; 398/131; 359/838; 359/877
(58) Field of Classification Search ........ 398/118–131; 359/838, 849, 850, 872, 899
See application file for complete search history.

(56) References Cited
U.S. PATENT DOCUMENTS

| | | | |
|---|---|---|---|
| 5,594,580 A * | 1/1997 | Sakanaka et al. ........... 398/122 |
| 5,627,669 A * | 5/1997 | Orino et al. ................ 398/129 |
| 5,689,354 A * | 11/1997 | Orino ......................... 398/129 |
| 6,175,451 B1 * | 1/2001 | Iriyama et al. ............. 359/627 |
| 6,335,811 B1 * | 1/2002 | Sakanaka .................... 398/129 |
| 6,616,352 B1 * | 9/2003 | Shigeta et al. ............. 398/156 |
| 7,157,695 B2 * | 1/2007 | Watanabe .................. 250/234 |
| 7,190,905 B2 * | 3/2007 | Sakanaka .................... 398/129 |
| 2004/0141754 A1 * | 7/2004 | Cheng et al. ............... 398/122 |

FOREIGN PATENT DOCUMENTS

JP    11-346192 A    12/1999

* cited by examiner

*Primary Examiner*—Kenneth Vanderpuye
*Assistant Examiner*—Phyowai Lin
(74) *Attorney, Agent, or Firm*—Canon U.S.A. Inc. I.P. Div

(57) ABSTRACT

An optical-space transmission apparatus for use in communication by using light propagating in a space includes a light-receiving unit, an optical system including a movable mirror and introducing light incident thereon to the light receiving unit with the movable mirror, a controller controlling drive of the movable mirror, and a detecting unit detecting an intensity of the light received in the light-receiving unit. The controller modifies a control characteristic of the movable mirror in accordance with a change in the received-light intensity.

4 Claims, 6 Drawing Sheets

OPTICAL-TRANSMISSION-SPACE DETERMINING APPARATUS AND OPTICAL-SPACE TRANSMISSION APPARATUS

BACKGROUND OF THE INVENTION

1. Field of the Invention

The present invention relates to an optical-transmission-space determining apparatus for determining a state of the atmosphere where a light beam propagates and an optical-space transmission apparatus for use in telecommunication by propagating a light beam.

2. Description of the Related Art

An optical-space communication system for use in communication between a counterpart apparatus (remotely located) and an apparatus (locally located) by means of a light beam through the atmosphere as a transmission channel allows for a large capacity of data to be communicated at high speeds, is more portable than a wire communication system using, for example, an optical fiber, and also its communication channel can be easily and freely established.

In order to establish a reliable communication channel with this optical-space communication system, a light beam emitted from the locally located apparatus must not veer away from the counterpart apparatus. To this end, the diameter of the light beam must be made greater or an automatic tracking function always automatically adjusting an angle of a movable mirror so as to prevent the light beam from veering away from the counterpart apparatus must be provided.

An optical-space transmission apparatus including such an automatic tracking function is shown in FIG. 6. FIG. 6 is a perspective view of the optical-space transmission apparatus performing optical communication with the counterpart apparatus through space used as a transmission channel.

A part of a light beam emitted from the counterpart apparatus (not shown) passes through a half-mirror 140 and is incident on a four-piece light-receiving device 146. A signal in accordance with an intensity distribution of a light spot formed on a receiving surface of the four-piece light-receiving device 146 is outputted from the same, and an automatic-tracking error angle made by the optical axes of transmitting and receiving light beams is computed by an operating circuit 147 on the basis of the output signal. The operating circuit 147 sends a command signal to a movable-mirror control circuit 148 so as to make the error angle zero. The movable-mirror control circuit 148 adjusts an angle of a movable mirror 132 by simultaneously driving X- and Y-axes actuators 151. Such an optical-space transmission apparatus is disclosed, for example, in Japanese Patent Laid-Open No. 11-346192.

Upon propagating in the atmosphere, a light beam undergoes influence of a positional and temporal variation (scintillation) due to fluctuation of the atmosphere, whereby the light beam incident on the counterpart apparatus has an uneven intensity distribution. Accordingly, when a response speed of the automatic-tracking function is made higher, a tracking operation is performed on the basis of the uneven intensity distribution. As a result, irrespective of the fact that the light beam normally reaches the counterpart apparatus, the scintillation causes an emitting direction of the light beam to be vibrated, thereby leading to a tracking error of the light beam and accordingly to an increase or decrease in received-light optical power.

Since many of the optical-space transmission apparatuses are installed on the roof top of a building, indoors or the like where the apparatuses undergo a relatively small level of vibration, the movable-mirror control circuit 148 limits an automatic-tracking response characteristic in the low frequency range by arranging driving voltages Vx and Vy fed to the actuators 151 to pass through a low-pass filter unit 150. By limiting the response characteristic in the low-frequency range as described above, in which a major part of frequency components of scintillation is not included, the automatic tracking function operates so as to reduce influence of scintillation.

Unfortunately, even though many optical-space transmission apparatuses are installed on the roof top of a building, indoors or the like where the apparatuses undergo a relatively small level of vibration, some apparatuses are possibly installed at places, other than the above-mentioned ones, where the apparatuses are subjected to vibration or a pressure of window. Because of limiting a response characteristic of the automatic-tracking function only in the low-frequency range, the foregoing known optical-space transmission apparatus is incapable of responding to a quick variation such as vibration, whereby its installation place is limited.

Especially, in the night, in the morning, in the evening, or in the rainy or cloudy daytime when a level of scintillation is low, limiting the response characteristic of the automatic-tracking function only in the low frequency range is not needed. Hence, the limiting the function only in the low frequency range causes the transmission apparatus to be operated in a state in which an effect of the automatic tracking function is not fully achieved.

SUMMARY OF THE INVENTION

The present invention is directed to an optical-space transmission apparatus for use in communication by using light propagating in a space. In one aspect of the present invention, an optical-space transmission apparatus includes a light-receiving unit, an optical system including a movable mirror and introducing light incident thereon to the light receiving unit with the movable mirror, a controller controlling drive of the movable mirror, and a detecting unit detecting an intensity of the light received in the light-receiving unit. The controller modifies a control characteristic of the movable mirror in accordance with a change in the received-light intensity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAIL DESCRIPTION OF THE PREFERRED EMBODIMENTS

Embodiments of the present invention will be described with reference to the attached drawings.

First Embodiment

Figure 1:
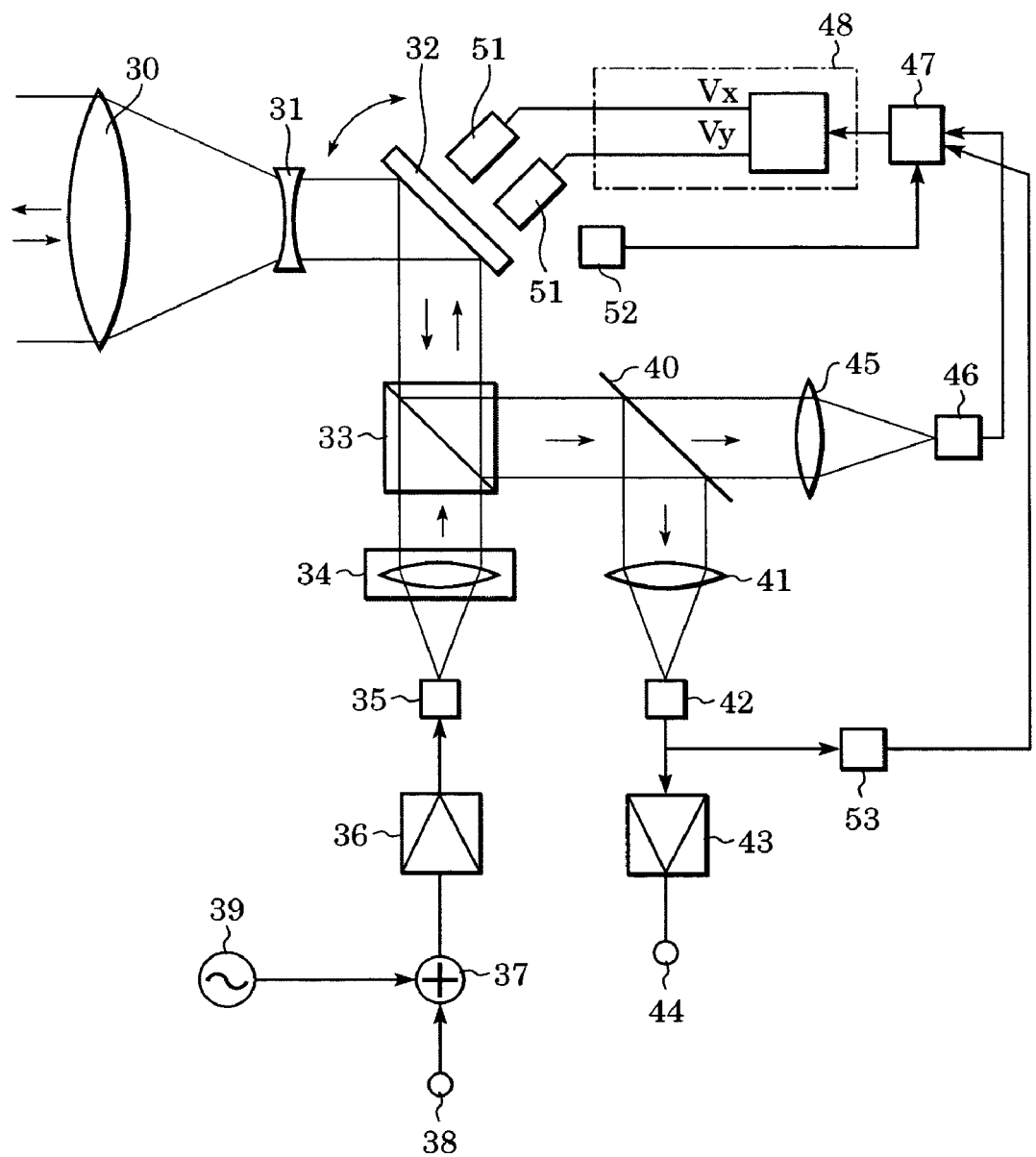
FIG. 1 is a perspective view of an optical-space transmission apparatus according to a first embodiment of the present invention.

Referring now to FIG. 1, the structure of an optical-space transmission apparatus according to a first embodiment of the present invention will be described. FIG. 1 is a perspective view of the optical-space transmission apparatus according to the present embodiment.

A transmitting main signal from a signal input unit 38 is multiplexed with an automatic-tracking pilot signal from a pilot-signal generating circuit 39 by a optical multiplexing circuit 37; is changed to an optical signal by a light-emitting device 35 after passing through an amplifier 36; passes through a collimator lens 34 and a polarization beam splitter 33; is reflected from a movable mirror 32 (a first movable unit); and, as a transmitting light beam, is projected onto a counterpart apparatus (not shown) through lenses 31 and 30.

A received light beam from the counterpart apparatus passes through the lenses 30 and 31 and the movable mirror 32; is reflected from the polarization beam splitter 33; and is then incident on a mirror 40. Since the mirror 40 serves as a half-mirror, light passing through the mirror 40 passes through a light-collecting lens 45 and is incident on a four-piece light-receiving device 46, while light reflected from the mirror 40 passes through a light-collecting lens 41 and is incident on a light-receiving device 42. The light incident on the light-receiving device 42 is converted to an electrical signal, amplified by an amplifier 43, and then outputted from a main-signal output 44.

The four-piece light-receiving device 46 outputs a signal in accordance with an intensity distribution of a light spot formed on a light-receiving surface thereof, and an operating circuit 47 computes an automatic-tracking error angle made by the optical axes of transmitting and receiving light beams on the basis of the output signal.

The operating circuit 47 sends a command signal to a movable-mirror control circuit 48 so as to make the error angle zero. The movable-mirror control circuit 48 adjusts an angle of the movable mirror 32 by simultaneously driving X- and Y-axes actuators 51.

Since the angle of the movable mirror 32 has been previously detected by a mirror-position sensor 52, and the detected result is fed back to the operating circuit 47, the movable-mirror control circuit 48 controls the movable mirror 32 so as to lie at an angle corresponding to that of the command signal outputted from the operating circuit 47.

The electrical signal from the light-receiving device 42 is also outputted to a received-light-intensity detecting circuit 53, and a received-light intensity of the light incident on the light-receiving device 42 is detected.

The received-light intensity detected by the received-light-intensity detecting circuit 53 is outputted, as a received-light intensity signal, to the operating circuit 47, and is subjected to a computing process of the operating circuit 47 so as to compute a change in the received-light intensity. That is, in the present embodiment, the mean, the maximum, and the minimum values of the received-light intensity during a predetermined period are computed. These examples are shown in FIG. 3.

Figure 3:
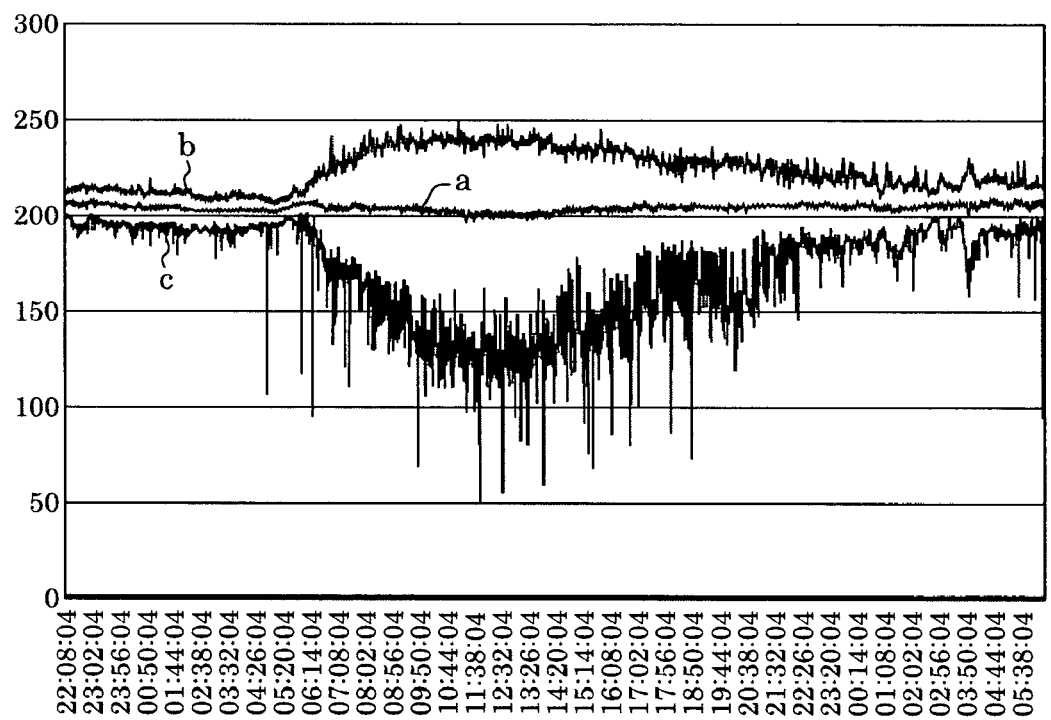
FIG. 3 illustrates the mean, the maximum, and the minimum values of a received-light intensity.

FIG. 3 is a graph of a received-light intensity from mid-night on a certain day to dawn on the next day, wherein the horizontal and vertical axes of the graph respectively indicate a time and a relative received-light intensity. Of three lines in the graph, a relatively flat middle line a, an upper line b, and a largely varying lower line c respectively indicate the mean, the maximum, and the minimum values of the received-light intensity (OPT RX) during one minute.

As shown in the figure, while a low level of scintillation occurring during a time period from mid-night to dawn results in small differences between respective two of the mean, the minimum, and the maximum values, as the level of scintillation becomes higher from morning to daytime, the differences become greater and attain respective maximums around noon. As the level of scintillation becomes lower from early evening to mid-night, the difference becomes smaller. In other words, by comparing the mean, the minimum, and the maximum values of a received-light intensity, a level scintillation can be obtained. Meanwhile, the level of scintillation mentioned here indicates a magnification of variation of a received-light intensity caused by fluctuation of the atmosphere.

In an optical-space communication system, since propagating light is sometimes attenuated depending on the climate conditions such as rainy and foggy conditions, the mean value of a received-light intensity varies greatly in accordance with these climate conditions. In the meantime, if a variation in the received-light intensity caused by attenuation due to a rainy or foggy climate can be distinguished from that caused by scintillation by comparing the mean and the minimum values. Regardless of the intensity of, for example, the mean value, when a difference in intensities between the minimum and the mean values is small, it is determined that the level of scintillation is low. Also, even in a good weather condition as shown in FIG. 3, and even when the mean value has nearly no variation, the minimum or the maximum value varies greatly, whereby a level of scintillation can be obtained from a difference in intensities between, for example, the minimum and the mean values.

Although the level of scintillation can be obtained by comparing at least two of the maximum, minimum, and mean values, according to the results shown in FIG. 3, since a variation in the minimum value is largest, the level of scintillation should be determined on the basis of a difference between the minimum and the mean values or between the minimum and maximum values. While a time span for obtaining the mean, the minimum, and the maximum values is set at one minute in the present embodiment in FIG. 3, another time span may be arbitrarily set in accordance with a performance of an automatic-tracking mechanism, a processing capability of the operating circuit 47, and so forth.

As long as the operating circuit 47 determines that the level of scintillation obtained as described above is especially high and that there is hence a risk that a tracking error caused by the scintillation adversely affects signal transmission, for example, occurrence of a transmission error, the operating circuit 47 takes action such as making the tracking speed (response speed) slower so as to limit a tracking characteristic of the apparatus in the low-frequency region. More particularly, for example, a constant of a digital filter of a tracking control program is changed by software so as to limit the high-frequency region of tracking characteristic.

Whereas, unless a level of normal scintillation is especially high, no action of limiting the tracking characteristic in the low-frequency region is taken, thereby responding to a quick variation such as vibration without deterioration in a tracking performance.

Instead of changing a constant of a digital filter so as to make the tracking speed lower, a gain of a tracking control loop may be made smaller by software so as to make the response more insensitive. With this method, the tracking speed is resultantly made lower.

Figure 4:
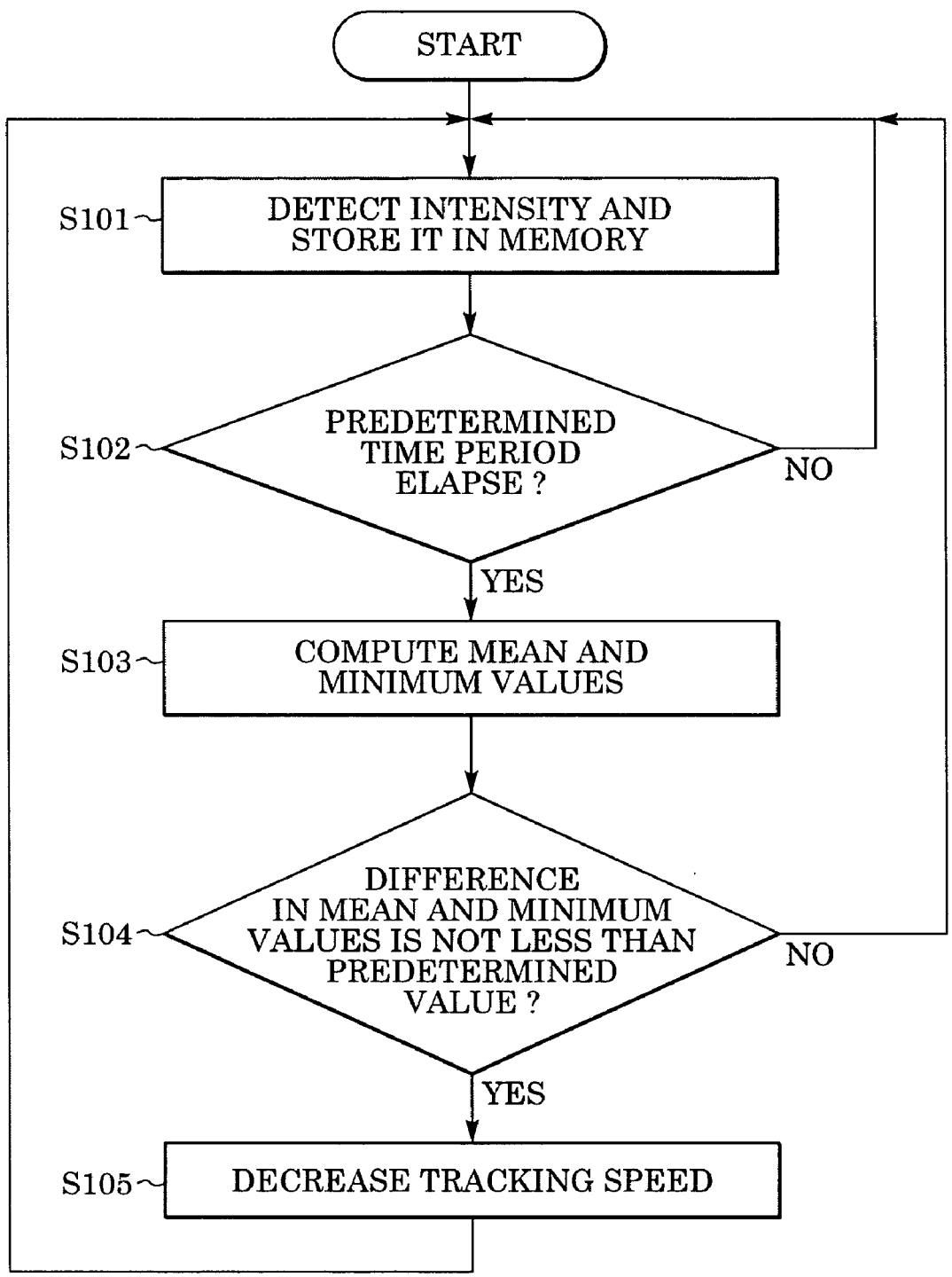
FIG. 4 is a flowchart of a control procedure of a tracking speed of the optical-space transmission apparatus according to the first embodiment.

Referring now to FIG. 4, a control procedure of a tracking speed of the optical-space transmission apparatus according to the present embodiment will be described. FIG. 4 illustrates a flowchart of the control procedure. On the basis of the electrical signal outputted from the light-receiving device 42, the received-light-intensity detecting circuit 53 detects a received-light intensity and stores it in a memory (not shown) (S101). In step S102, it is determined whether a predetermined time period has lapsed. After lapse of the predetermined time period from start of detecting the intensity, on the basis of the detected results stored in the memory, the operating circuit 47 computes the mean and the minimum values of the received-light intensity during the predetermined time period (S103). A determination is made whether the level of scintillation is not lower than a predetermined one, which is typically set at 70% to 90% of the mean value, that is, whether a difference between the computed minimum and mean values is not smaller than a predetermined value (S104). When the difference between the minimum and the mean values is not smaller than the predetermined value, the tracking speed is lowered so as to limit the tracking characteristic in the low-frequency region (S105).

While a received-light intensity is detected on the basis of an output of the light-receiving device 42 in the embodiment shown in FIG. 1, by summing outputs of four light-receiving devices of the four-piece light-receiving device 46, it can be detected in the device 46 even when the received-light-intensity detecting circuit 53 for the light-receiving device 42 is not used. In this case, the operating circuit 47 can perform the summing operation by software without especially providing an additional hardware component. As a matter of course, these two detecting methods may be used at the same time if needed.

While a state of a space serving as an optical communication channel is determined on the basis of the mean, the minimum, and the maximum values of a received-light intensity during a predetermined period according to the present embodiment, the state may be determined, for example, on the basis of the number of frequencies of a received-light intensity exceeding or falling below a predetermined value.

Second Embodiment

Figure 2:
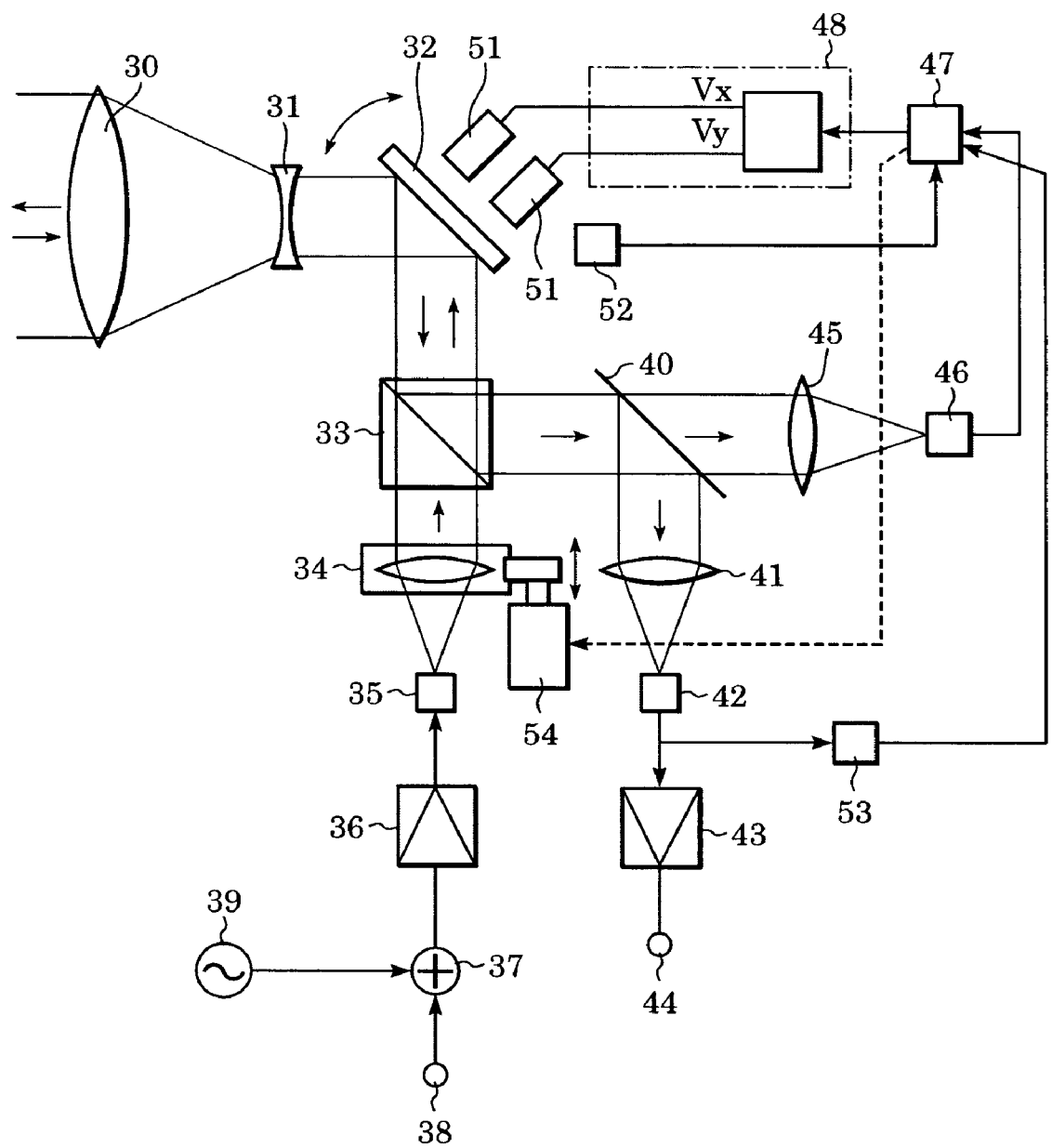
FIG. 2 is a perspective view of an optical-space transmission apparatus according to a second embodiment of the present invention.

FIG. 2 is a perspective view of an optical-space transmission apparatus according to a second embodiment of the present invention. According to the present embodiment, on the basis of a difference (a level of scintillation) between two of, for example, the mean, the minimum, and the maximum values of a received-light intensity, the apparatus operates so as to increase a diverging angle of a transmitting light beam to an extent that scintillation does not cause a tracking error, while leaving the control speed unchanged. The same parts as those in the first embodiment are denoted by the same reference numbers and their descriptions are omitted.

In the same manner as in the first embodiment, when the operating circuit 47 determines that a level of scintillation exceeds a predetermined one and that there is hence a risk that a tracking error caused by the scintillation adversely affects signal transmission, for example, occurrence of a transmission error, the operating circuit 47 sends a drive signal to a focus drive motor 54 so as to drive the collimator lens 34 (a second movable unit) in a direction along which it comes closer to the light-emitting device 35. This arrangement allows Light of the light-emitting device 35 to be emitted at a point closer to the collimator lens 34 than its focal point.

As a result, a diverging angle of a transmitting light beam becomes greater.

Figure 5:
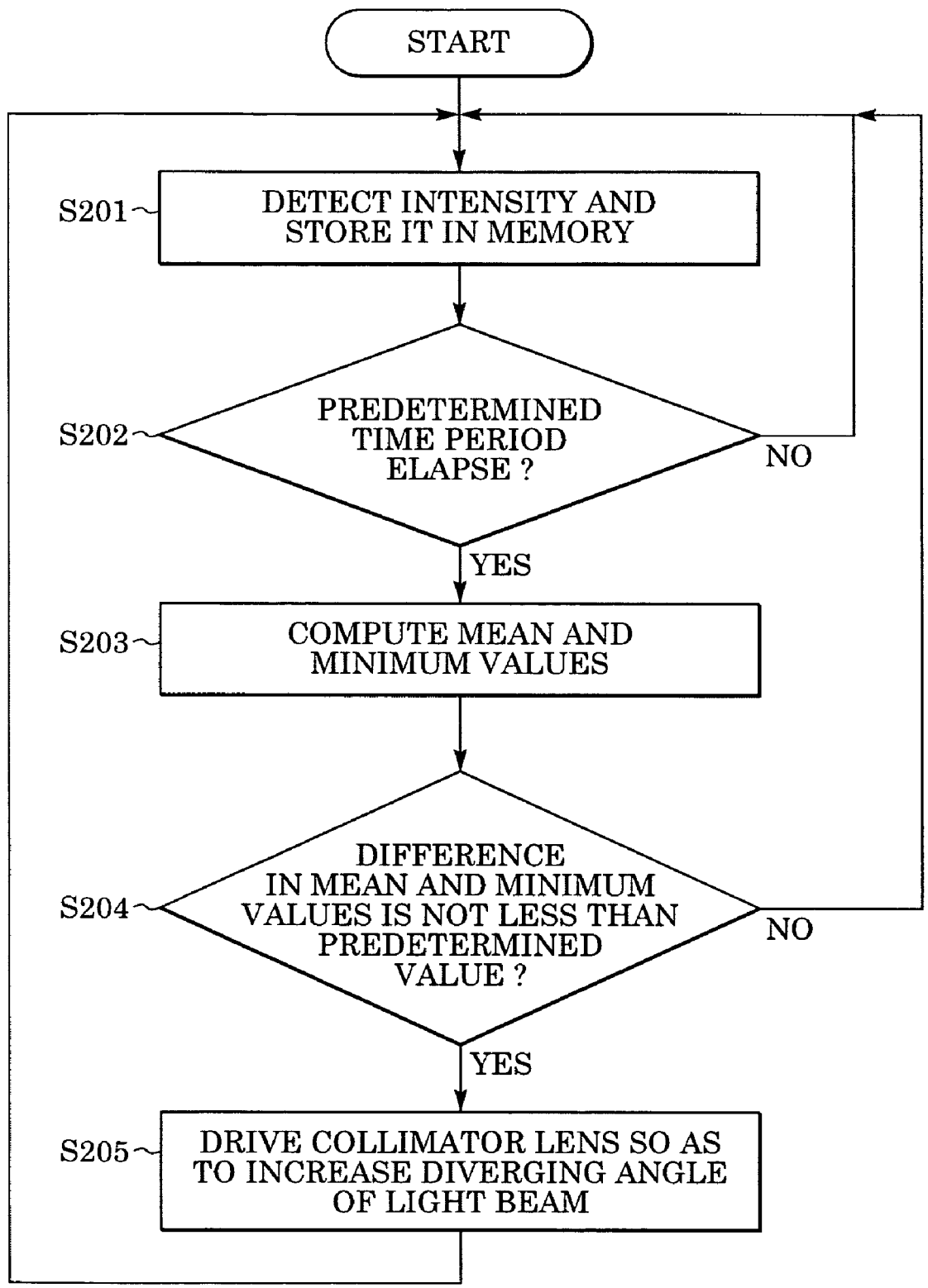
FIG. 5 is a flowchart of a control procedure of controlling a collimator lens of the optical-space transmission apparatus according to the second embodiment.
Figure 6:
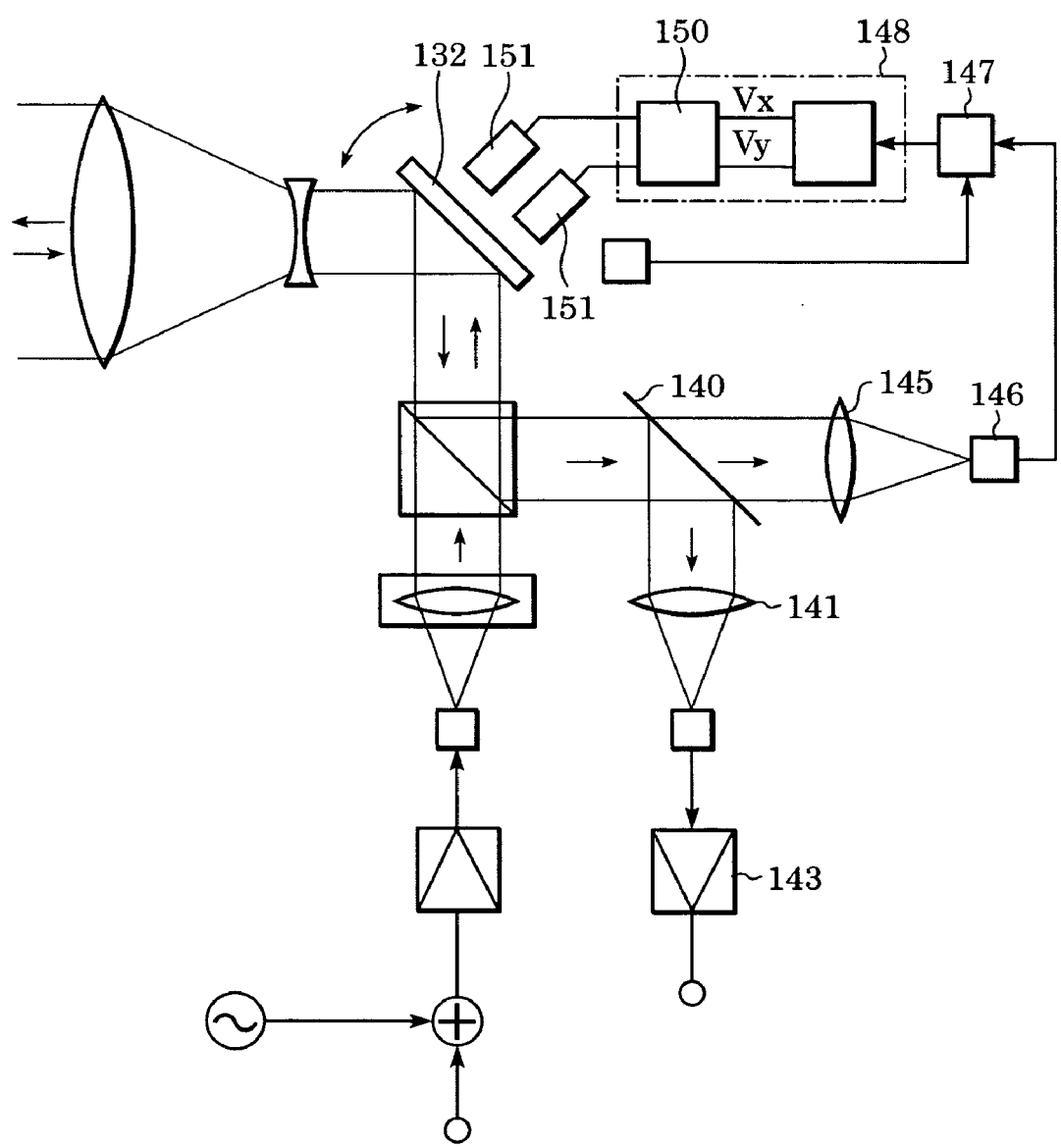
FIG. 6 is a perspective view of a known mirror-driving mechanism.

Referring now to FIG. 5, a procedure of drive control of the collimator lens 34 will be described. FIG. 5 is a flowchart of a control procedure of the collimator 34.

The received-light-intensity detecting circuit 53 detects a received-light intensity on the basis of an electrical signal outputted from the light-receiving device 42 and stores it in a memory (not shown) (S201). It is determined whether a predetermined time period has lapsed (S202). After lapse of the predetermined time period from start of detecting the intensity, on the basis of the detected results stored in the memory, the operating circuit 47 computes the mean and the minimum values of the received-light intensity obtained during the predetermined time period (S203). A determination is made whether the level of scintillation is not lower than a predetermined one, that is, whether a difference between the computed minimum and mean values is not smaller than a predetermined value (S204). When the difference between the minimum and the mean values is not smaller than the predetermined value, the operating circuit 47 sends a drive signal to the focus drive motor 54 so as to drive the collimator lens 34 and accordingly to make the diverging angle of a transmitting light beam greater (S205).

Even when a tracking error is generated due to scintillation, by increasing the diverging angle of a transmitting light beam as described above, transmitting light is prevented from veering away from the counterpart apparatus. Also, while the intensity of light received by the counterpart apparatus is reduced by increasing the diverging angle of a light beam, in principle, a high level of scintillation occurs in fine weather in which the atmosphere has a high transmittance, and sufficient transmitting light reaches the counterpart apparatus, whereby there is no risk that the counterpart apparatus receives light having an insufficient intensity, even when a light beam is diverged.

On the contrary, in bad weather such as a rainy or foggy condition, since a level of scintillation is low and transmitting light is largely attenuated by the atmosphere, sending of transmitting light to the counterpart apparatus is effectively achieved by enhancing the tracking performance and making the diameter of a light beam smaller.

In the above-described embodiment, a magnification of a variation (a level of scintillation) in received-light caused by fluctuation of the atmosphere is computed on the basis of the mean, the minimum, and the maximum values of the received-light obtained during a predetermined time period, and a control characteristic (a gain or a response speed) of the automatic-tracking function, or the diverging angle of a transmitting light beam is changed on the basis of the computed results. With this arrangement, high quality optical-space communication is achieved without deteriorating the automatic-tacking performance in a normal state, except the case where a level of scintillation is especially high.

According to a first structure of an optical-transmission-space determining apparatus according to an embodiment of the present invention, a state of a space allowing light to propagate therein can be determined. Accordingly, for example, the optical-space transmission apparatus can be controlled on the basis of the determined result.

Also, according to the first structure of the optical-transmission-space determining apparatus, a control characteristic of the movable mirror (the first movable unit) can be modified in accordance with a change in a received-light intensity. Further, according to a second structure of the optical-transmission space determining apparatus, drive of the movable lens (the second movable unit) can be controlled in accordance with a change in the received-light intensity.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2004-161101 filed May 31, 2004, which is hereby incorporated by reference herein.

What is claimed is:

1. An optical-space transmission apparatus for use in communication by using light propagating in a space, comprising:
   a light-receiving unit;
   an optical system including a movable mirror and introducing light incident thereon to the light receiving unit with the movable mirror;
   a controller controlling drive of the movable mirror; and
   a detecting unit detecting an intensity of the light received in the light-receiving unit,
   wherein the controller drives the movable mirror so that the speed of the movable mirror when the change of the intensity of the light received is larger than a predetermined value is slower than the speed of the movable mirror when the change of the intensity of the light received is smaller than the predetermined value.

2. The optical-space transmission apparatus according to claim 1, wherein the controller modifies the speed of the movable mirror on the basis of a comparison of at least two of maximum, minimum and mean values of the received-light intensity during a predetermined time period.

3. An optical-space transmission apparatus for use in communication by using light propagating in a space, comprising:
   a light-receiving unit receiving light propagating in the space;
   a light-emitting unit;
   an optical system including a movable lens and emitting the light from the light-emitting unit into the space;
   a detecting unit detecting an intensity of the light received in the light-receiving unit; and
   a controller controlling drive of the movable lens based on a change in the received light intensity,
   wherein the controller drives the movable lens so that a diverging angle of the emitted light when the change of the intensity of the light received is larger than a predetermined value is larger than the diverging angle when the change of the intensity of the light received is smaller than the predetermined value.

4. The optical-space transmission apparatus according to claim 3, wherein the controller modifies the diverging angle of the emitted light on the basis of a comparison of at least two of maximum, minimum, and mean values of the received-light intensity during a predetermined time period.

* * * * *